(12) United States Patent
Lausch et al.

(10) Patent No.: US 10,493,406 B2
(45) Date of Patent: Dec. 3, 2019

(54) FILTER MODULE

(71) Applicant: Sartorius Stedim Biotech GmbH, Goettingen (DE)

(72) Inventors: Ralf Lausch, Goettingen (DE); Paschalis Nikoloudis, Goettingen (DE); Wilhelm Requate, Heilbad Heiligenstadt (DE); Johannes Wortmeyer, Goettingen (DE)

(73) Assignee: Sartorius Stedim Biotech GmbH (DE)

( * ) Notice: Subject to any disclaimer, the term of this patent is extended or adjusted under 35 U.S.C. 154(b) by 213 days.

(21) Appl. No.: 15/038,633

(22) PCT Filed: Nov. 20, 2014

(86) PCT No.: PCT/EP2014/075077
§ 371 (c)(1),
(2) Date: May 23, 2016

(87) PCT Pub. No.: WO2015/075099
PCT Pub. Date: May 28, 2015

(65) Prior Publication Data
US 2016/0296890 A1 Oct. 13, 2016

(30) Foreign Application Priority Data
Nov. 21, 2013 (DE) .......................... 10 2013 112 863

(51) Int. Cl.
*B01D 63/02* (2006.01)
*B01D 65/00* (2006.01)
*B01D 71/68* (2006.01)

(52) U.S. Cl.
CPC ......... *B01D 63/023* (2013.01); *B01D 65/003* (2013.01); *B01D 71/68* (2013.01); *B01D 2313/04* (2013.01)

(58) Field of Classification Search
CPC ............ B01D 2313/04; B01D 2313/06; B01D 2313/13; B01D 2313/21; B01D 2313/20;
(Continued)

(56) References Cited

U.S. PATENT DOCUMENTS

| 4,283,284 A | 8/1981 | Schnell |
| 2003/0029785 A1 | 2/2003 | Dannenmaier |

(Continued)

FOREIGN PATENT DOCUMENTS

| DE | 10 2007 052 088 | 5/2009 |
| EP | 0 315 252 | 5/1989 |

(Continued)

OTHER PUBLICATIONS

English language machine translation of WO 0177284, 13 pages, No Date.*

(Continued)

*Primary Examiner* — Pranav N Patel
(74) *Attorney, Agent, or Firm* — Gerald E. Hespos; Michael J. Porco; Matthew T. Hespos

(57) ABSTRACT

A filter module (1) has a housing (2) formed from a plastic and a filter (3) made from a plastic is arranged in the housing (2). The housing (2) is bonded adhesively to the filter (3) by an adhesive (15) via a first bonding surface (7, 18) made from a first plastic and via a second bonding surface (14, 19, 21) made from a second plastic. The adhesive bonding of the first bonding surface (7, 18) and the second bonding surface (14, 19, 21) is accomplished via an intermediate piece (10, 20) with the bonding surfaces (14, 18, 21) made from a plastic that is identical to or different from the first plastic. At least one of the bonding surfaces (7, 18, 19, 14, 21) has been activated by plasma or corona pre-treatment prior to the adhesive bonding.

15 Claims, 3 Drawing Sheets

(58) Field of Classification Search
CPC ............ B01D 2313/23; B01D 2313/44; B01D 2313/54; B01D 2313/56; B01D 63/02; B01D 63/021; B01D 65/003; B01D 71/68
See application file for complete search history.

(56) References Cited

U.S. PATENT DOCUMENTS

| | | |
|---|---|---|
| 2003/0102264 A1 | 6/2003 | Pope et al. |
| 2004/0195165 A1 | 10/2004 | Bernard et al. |
| 2008/0237127 A1* | 10/2008 | Okafuji ............... A61M 1/16 210/646 |
| 2010/0072124 A1* | 3/2010 | Morikawa ............. B01D 63/02 210/321.79 |
| 2013/0061748 A1 | 3/2013 | Sims et al. |

FOREIGN PATENT DOCUMENTS

| | | |
|---|---|---|
| WO | 98/45028 | 10/1998 |
| WO | 01/60502 | 8/2001 |
| WO | 01/77284 | 10/2001 |

OTHER PUBLICATIONS

English Translation of International Preliminary Report on Patentability dated May 24, 2016.
International Search Report.

* cited by examiner

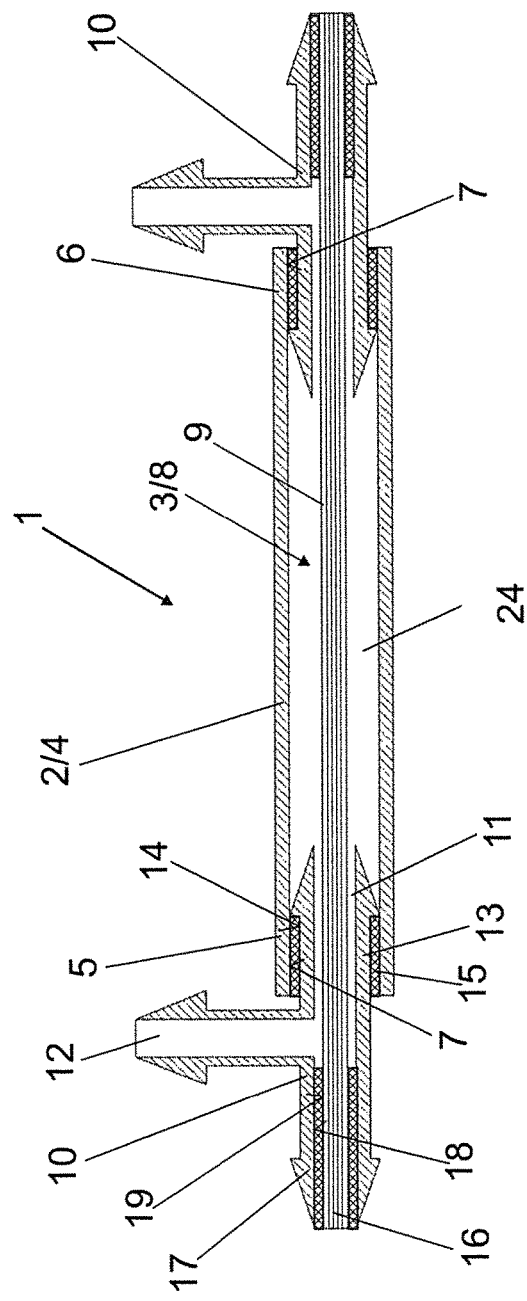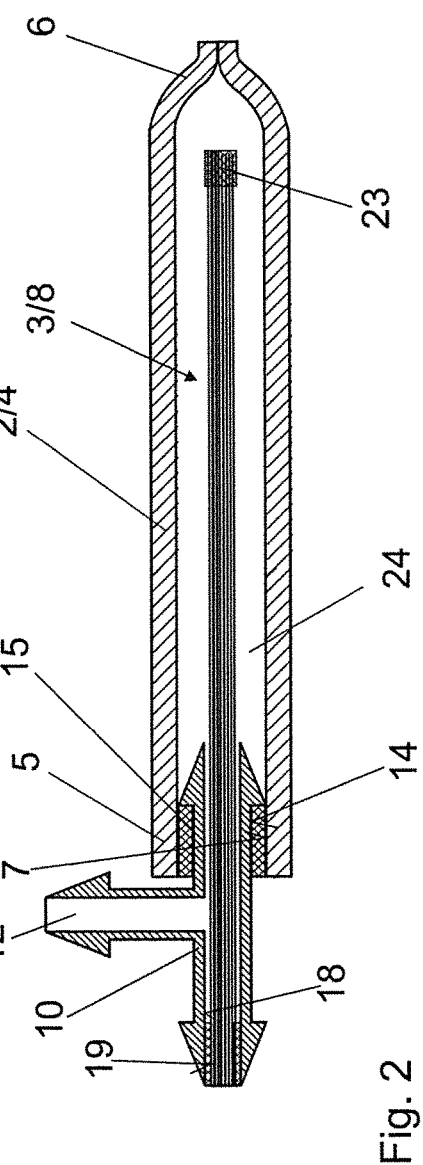

FILTER MODULE

BACKGROUND

1. Field of the Invention

The invention relates to a filter module with a housing formed from a first plastic and with a filter which is arranged in the housing and is made from a second plastic, wherein the housing is adhesively bonded to the filter by means of an adhesive via a first bonding surface of the housing made from the first plastic and via a second bonding surface of the filter made from the second plastic.

The invention further relates to a method for using a filter module and to a method for producing a filter module.

2. Description of the Related Art

DE 10 2007 052 088 A1 discloses a filter module with a tubular housing made of a plastic within which a filter made of a ring-shaped bundle of hollow fiber membranes is arranged. The housing made of a plastic has a first bonding surface at its respective ends that is adhesively bonded using adhesive to a second bonding surface formed by the ends of the membrane filter. The hollow fiber membranes are sealed with a potting resin at their end adjacent to an inlet and are open at their other end facing an outlet.

The adhesive bonds must withstand not only the filtration pressure but also the test pressures required in biotechnology.

In the case of the known filter module it is disadvantageous that tube sleeves overlapping the housing tube ends are arranged at the ends and these are relatively laborious to install. Nevertheless, there is a risk that the adhesive bonding between the bonding surfaces will not withstand the high test pressures required in biotechnology.

The problem that the present invention seeks to solve is to improve the known filter modules and the methods for their manufacture so that they have, on the one hand, a cost-effective design and, on the other, can withstand a test pressure up to 5 bar.

SUMMARY

The invention relates to a filter module with a housing formed from a first plastic. A filter is arranged in the housing and is formed from a second plastic the housing is bonded adhesively to the filter by an adhesive via a first bonding surface of the housing made from the first plastic and via a second bonding surface made from the second plastic. Adhesive bonding of the first bonding surface of the housing and of the second bonding surface of the filter is accomplished via an intermediate piece with bonding surfaces made from a plastic that is identical to or different from the first plastic, and at least one of the bonding surfaces is activated by plasma or corona pre-treatment prior to the adhesive bonding.

Plasma or corona pre-treatment uses electrical discharge to change the surface of polymers. This results in the formation of functional groups on the surface of the substrate that enable improved adhesion and wettability. Pre-treatment with atmospheric plasma is especially cost-efficient. Surface treatment using plasma activation enables adhesive bonding of sufficient strength and also sufficient long-term durability. In particular, it also makes it possible to adhesively bond different plastics to one another.

The housing may be designed as a flexible tube and the filter may be a hollow fiber element having a plurality of hollow fiber membranes. The entire filter module thus has a certain flexibility to simplify connection of the filter module. The filter module therefore serves not only for filtration of media passed through it but also as a flexible connection.

The hollow fiber element may be sealed at least to a first end in a radial direction with respect to the adjacent tube end and the first end of the hollow fiber element may be bonded adhesively directly to the tube or to the intermediate piece that is connected firmly to the tube. In particular, the hollow fiber membranes of the hollow fiber element are open at the first end. The hollow fiber membranes can be either open or sealed at the second end of the hollow fiber element facing away from the first end. A ring-shaped channel is arranged between the tube and the hollow fiber element, and is connected to at least one connection. Depending on the configuration, the subject of the application can therefore be operated in "dead-end" as well as "cross-flow" mode.

The tube may be made of a silicone or polypropylene while the hollow fiber membranes are made of a polyethersulfone. In particular, the first end of the hollow fiber element, with its hollow fiber membranes, may be bonded adhesively to or potted with the tube or the intermediate piece using a polyurethane as an adhesive. The intermediate piece can be made of a thermoplastic, preferably polypropylene.

The plasma or corona pre-treatment of the bonding surfaces described above makes it possible to adhesively bond or pot the same or different plastics with the necessary strength.

In another embodiment of the invention, the hollow fiber element is sealed at its second end facing away from the first end in a radial direction vis-à-vis the adjacent tube end, with its hollow fibers being open at the second end. The second end of the hollow fiber element is bonded adhesively directly to the tube or to a second intermediate piece firmly attached to the tube. The one or more intermediate pieces can be designed as a T-shaped connector with a connection to the ring-shaped channel. In this case, both dead-end and cross-flow operation is possible.

The one or more intermediate pieces can however also be designed as a sleeve surrounding the end of the hollow fiber element.

The invention also relates to a method for using a filter module, such as the above-described filter module. The method includes attaching the filter module to a flexible container and together they form a connection-ready unit that can be pre-sterilized. In particular, the flexible container (bag) can be designed as a single-use bioreactor.

In each case, the hollow fiber membranes on the inlet side of the filter module are firmly and tightly attached to the tube or the connector piece, and the individual hollow fibers are open so that internal through-flow is possible. While the hollow fibers are exposed to a relatively high test pressure during performance of a filter integrity test, the ring-shaped channel surrounding the hollow fiber element, and therefore also the housing designed as a tube, are exposed to a significantly lower pressure. This ensures that the permissible working pressure of the tube, for example of the silicone tube, is significantly below the test pressure of the hollow fiber element and that the silicone tube is not exposed to undesirable loads during the test.

The invention further relates to a method for producing a filter module by performing the following steps:
 a) activating at least one of the bonding surfaces by plasma or corona pre-treatment prior to the adhesive bonding,
 b) adhesively bonding the bonding surfaces to one another using an adhesive, and
 c) curing the adhesive.

Activation of the bonding surfaces by plasma or corona pre-treatment prior to adhesive bonding results in an adhesive bond which has higher strength, e.g. during performance of a pressure test. In particular, it is possible to adhesively bond silicone or polypropylene to polyethersulfone and to use polyurethane as an adhesive.

According to another preferred embodiment of the invention, the adhesive in Step (b) is mixed from two components in a pre-specified ratio before it is applied or used for potting. It has proved favorable to cure the adhesive in Step (c) in a temperature-controlled centrifuge.

Further features and advantages of the invention may be derived from the following specific description and from the drawings.

BRIEF DESCRIPTION OF THE DRAWINGS

FIG. 1 is a lateral cross-sectional view of a filter module with a housing designed as a tube and with a filter designed as a hollow fiber element, suitable for both dead-end operation as well as cross-flow operation.

FIG. 2 is a lateral cross-sectional view of a filter module with a housing designed as a tube and with a filter designed as a hollow fiber element, wherein the hollow fiber membranes of the hollow fiber element are sealed at the free second end.

DETAILED DESCRIPTION

Figure 3:
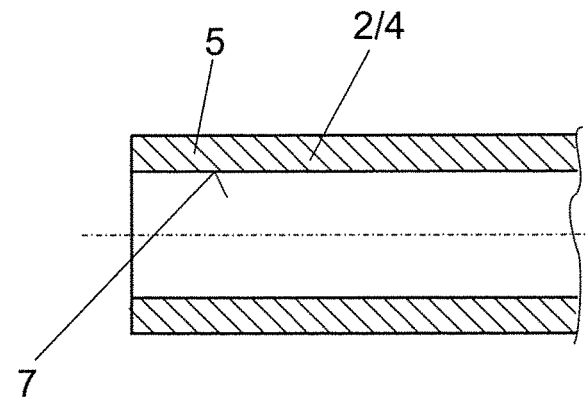
FIG. 3 is a lateral cross-sectional and detail view of the housing designed as a tube from FIG. 1.
Figure 4:
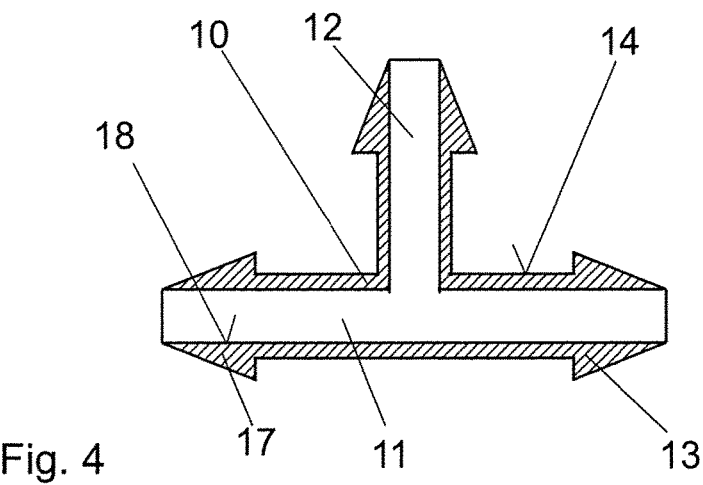
FIG. 4 is a lateral cross-sectional view of the intermediate piece from FIG. 1.
Figure 5:
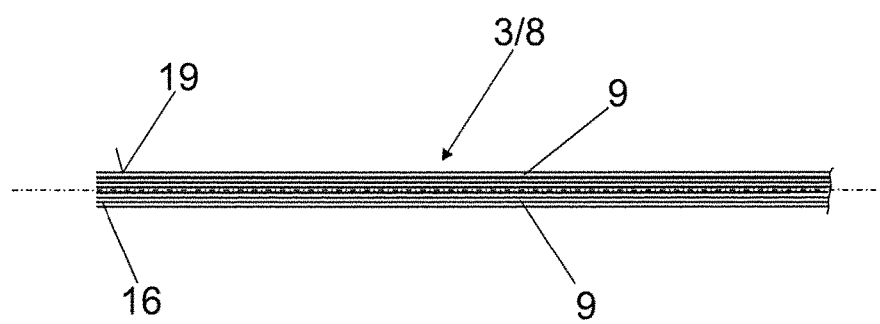
FIG. 5 is a lateral cross-sectional and detail view of the hollow fiber element from FIG. 1.

A filter module 1 essentially comprises a housing 2 and a filter 3.

In the exemplary embodiments in FIGS. 1 to 8, the housing 2 is designed as a flexible tube made of a first plastic, such as a silicone or a polypropylene. At both its first end 5 and, in accordance with the exemplary embodiment from FIG. 1, also at its second end 6, the tube 4 has a first bonding surface 7.

According to the exemplary embodiments in FIGS. 1, 2 and 5 to 8, the filter 3 is designed as a hollow fiber element 8 with a plurality of hollow fiber membranes 9. In the exemplary embodiments, the hollow fiber membranes 9, and therefore the hollow fiber element 8, are made of a polyethersulfone.

According to the exemplary embodiments from FIGS. 1 and 2, the hollow fiber element 8 is connected to the tube 4 by a T-shaped intermediate piece 10. The intermediate piece 10 has a pass-through channel 11 and a radial branch 12. At its first end 13 facing the tube 4, the intermediate piece 10 has a second bonding surface 14 that is adhesively bonded using an adhesive 15, which is a polyurethane in the exemplary embodiment. Before adhesive bonding takes place, the first bonding surface 7 is activated by plasma pre-treatment.

Between the tube 2 and the hollow fiber element 8 there is arranged a ring-shaped channel 24 that is connected to at least one connector 25.

In the exemplary embodiment from FIGS. 1 and 2, the hollow fiber element is adhesively bonded or potted using an adhesive, so as to form a seal, at its first end 16 facing the intermediate piece 10 in the second end 17 of the intermediate piece 10. The hollow fiber membranes 9 of the first end 16 of the hollow fiber element 8 are open.

The inner surface of the second end 17 of the intermediate piece 10 forms a first bonding surface 18 with respect to the first end 16 of the hollow fiber element 8 while the circumference of the first end 16 forms a second bonding surface 19, which can be adhesively bonded to the first bonding surface 18 using the adhesive 15. In this case also, the first bonding surface 18 of the intermediate piece 10 can be activated by plasma pre-treatment to enhance the strength of the adhesive bond.

Figure 6:
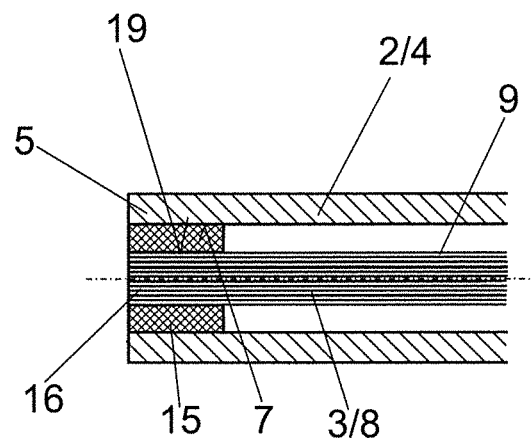
FIG. 6 is a lateral cross-sectional and detail view of an additional filter module having a filter, designed as a hollow fiber element, whose first end is potted with adhesive in a housing designed as a tube, and cut free.

According to the exemplary embodiment in FIG. 6, the first end 16 of the hollow fiber element 8 is directly attached to the first end 5 of the tube 4 without an intermediate piece. The first bonding surface 7 of the tube 4 is directly adhesively bonded using adhesive 15 to the second bonding surface 19 of the first end 16 of the hollow fiber element 8. Appropriately, the first bonding surface 7 was activated by a plasma pre-treatment before the adhesive bonding took place.

Figure 7:
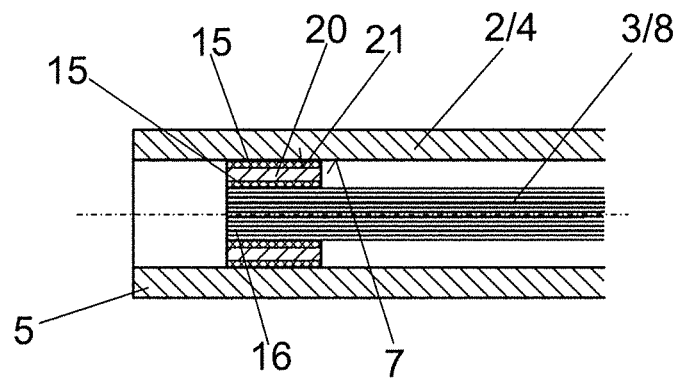
FIG. 7 is a lateral cross-sectional and detail view of an additional filter module in which the first end of a hollow fiber element is bonded into a sleeve-shaped intermediate piece, wherein the intermediate piece is itself adhesively bonded to the tube.
Figure 8:
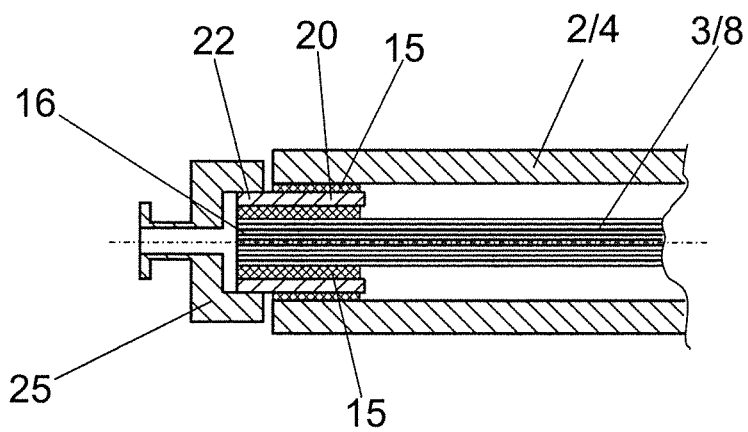
FIG. 8 is a lateral cross-sectional and detail view with a sleeve-shaped intermediate piece bonded onto the first end of the hollow fiber element, the intermediate piece being adhesively bonded within the first end of the tube, on the one hand, and being welded to an attached adapter, on the other.

According to the exemplary embodiments in FIGS. 7 and 8, the hollow fiber element 8 is connected to the first bonding surface 7 of the tube 4 via a sleeve-shaped intermediate piece 20 and to the second bonding surface 21 of the sleeve-shaped intermediate piece 20 using the adhesive 15.

While in the exemplary embodiment in FIG. 7 the first end 16 is arranged somewhat recessed within the first end 5 of the tube 4, in the exemplary embodiment in FIG. 8, the first end 16 of the hollow fiber element 8 along with the end 22 projects out of the first end 5 of the tube 4. An adapter 25 or connector is welded onto the projecting end 22 of the sleeve-shaped intermediate piece 20.

According to the exemplary embodiment in FIG. 2, the tube 4 is sealed at its second end 6, for example, by welding. Accordingly the hollow fiber membranes 9 at the second end 23 of the hollow fiber element 8 are also sealed. The second end 23 is freely arranged within the tube 4.

To produce the filter module, the following steps are performed, for example:
  a) the first bonding surface 7 of the housing 2 is activated with plasma,
  b1) the two-component adhesive 15 is mixed using a pre-specified ratio of resin to curing agent, e.g. 100:80,
  b2) the hollow fiber membranes 9 of the hollow fiber element 8 are potted or adhesively bonded within the tube 4 or the intermediate piece 10, 20,
  c) the filter module 1 is cured in a temperature-controlled centrifuge at 40° C. for 60 minutes at 960 revolutions per minute,
  c1) the filter modules undergo final curing for longer than 24 hours,
  d) the filter modules 1 are tested at a pressure of >2 bar,
  e) the filter modules are sterilized at 121° C. in an autoclave.

Of course, the embodiments discussed in the specific description and shown in the figures are merely illustrative exemplary embodiments of the present invention. In light of this disclosure, a person skilled in the art is given a wide range of possible variations.

LIST OF REFERENCE NUMBERS

1 Filter module
2 Housing of 1
3 Filter of 1
4 Tube
5 First end of 4
6 Second end of 4
7 First bonding surface of 2
8 Hollow fiber element
9 Hollow fiber membrane of 8
10 Intermediate piece (T-shaped)
11 Pass-through channel of 10
12 Branch of 10
13 First end of 10
14 Second bonding surface of 10
15 Adhesive
16 First end of 8
17 Second end of 10
18 First bonding surface of 20
19 Second bonding surface of 16
20 Intermediate piece (sleeve-shaped)
21 Second bonding surface of 20
22 Projecting end of 20
23 Second end of 8
24 Ring-shaped channel of 1
25 Adapter

The invention claimed is:

1. A filter module (1) comprising: a housing (2) formed from a first plastic, the housing (2) being a flexible tube (4); and a filter (3) arranged in the housing (2) and made from a second plastic that is different from the first plastic, the filter (3) is a hollow fiber element (8) having a plurality of hollow fiber membranes (9), the housing (2) being bonded adhesively to the filter (3) by an adhesive (15) via a first bonding surface (7) of the housing (2) made from the first plastic and via a second bonding surface (19) of the filter (3) made from the second plastic, the adhesive bonding of the first bonding surface (7) of the housing (2) and of the second bonding surface (19) of the filter (3) being accomplished via an intermediate piece (10) with bonding surfaces (14, 18, 21) made from a plastic that is different from the first plastic, and at least one of the bonding surfaces (7, 18, 19, 14, 21) having been activated by plasma or corona pre-treatment prior to the adhesive bonding, wherein:
    at least a first end (16) of the hollow fiber element (8) is sealed in a radial direction with respect to an adjacent first end (5) of the flexible tube (4), and the first end (16) of the hollow fiber element (8) is bonded adhesively to the intermediate piece (10) that is bonded adhesively to the flexible tube (4),
    the hollow fiber membranes (9) of the hollow fiber element (8) are open at the first end (16) of the hollow fiber element (8) and a ring-shaped channel (24) is arranged between the flexible tube (4) and the hollow fiber element (8) and is connected to at least one connection, and
    the intermediate piece (10) is a T-shaped connector with a connection to the ring-shaped channel (24).

2. The filter module of claim 1, wherein the flexible tube (4) is made of a silicone or polypropylene and the hollow fiber membranes (9) are made of a polyethersulfone.

3. The filter module of claim 1, wherein the first end (16) of the hollow fiber element (8) is adhesively bonded by its hollow fiber membranes (9) to the flexible tube (4) or to the intermediate piece (10) using a polyurethane as the adhesive (15).

4. The filter module of claim 1, wherein the intermediate piece (10) is made of a thermoplastic.

5. The filter module of claim 1, wherein the hollow fiber element (8) has a second end (23) facing away from the first end (16), the second end of the hollow fiber element (8) being sealed in a radial direction with respect to an adjacent second end (6) of the flexible tube (4), the hollow fiber membranes (9) being open at the second end (23), and the second end (23) of the hollow fiber element (8) being bonded adhesively directly to the tube (2) or to a second intermediate piece (10) that is bonded adhesively to the flexible tube (4).

6. The filter module of claim 1, wherein the hollow fiber membranes (9) of the hollow fiber element (8) are bonded adhesively and sealed at a second end (23) facing away from the first end (16).

7. A filter module (1) comprising:
    a flexible tube (4) formed from a first plastic, the flexible tube (4) having a first end (5) and an internal bonding surface (7) facing inward adjacent the first end (5);
    a filter (3) having hollow fiber membranes (9) made from a second plastic that is different from the first plastic, an intermediate portion of the filter (3) being in the flexible tube (4) so that a ring-shaped channel (24) is defined between the flexible tube (4) and the filter (3), the filter (3) having a first end (16) projecting beyond the first end (5) of the flexible tube (4) and having a filter bonding surface (19) adjacent the first end of the filter (3) and external of the flexible tube (4);
    a T-shaped connector (10) with an external bonding surface (14) opposed to the internal bonding surface (7) of the flexible tube (4), the connector (10) further having an interior communicating with the ring-shaped channel (24) between the flexible tube (4) and the filter (3), the interior having an internal bonding surface (18) opposed to the filter bonding surface (19) of the filter (3);
    a first adhesive area bonding the filter bonding surface (19) to the internal bonding surface (18) of the connector (10) and sealing the filter (3) in a radial direction while keeping the hollow fiber membranes (9) open at the first end (16) of the filter (3); and
    a second adhesive area (15) bonding the internal bonding surface (7) of the flexible tube (4) to the external bonding surface (14) of the connector (10), wherein at least the internal bonding surface (7) is activated by plasma or corona pre-treatment prior to the adhesive bonding.

8. The filter module (1) of claim 7, wherein the internal bonding surface (18) of the connector (10) is activated by plasma or corona pre-treatment prior to the adhesive bonding.

9. The filter module (1) of claim 7, wherein the tube (2) is made of a silicone or polypropylene and the hollow fiber membranes (9) are made of a polyethersulfone.

10. The filter module of claim 7, wherein the filter bonding surface (19) is bonded adhesively to the internal bonding surface (18) of the connector (10) using a polyurethane adhesive (15).

11. The filter module of claim 7, wherein the connector (10) is made of a thermoplastic.

12. The filter module of claim 7, wherein the flexible tube (4) further has a second end spaced from the first end along a longitudinal direction of the flexible tube (4), the hollow fiber membranes (9) of the filter (3) extending parallel to the longitudinal direction of the flexible tube (4).

13. The filter module of claim 12, wherein a radial dimension of the first adhesive area is substantially uniform at all locations along the first adhesive area.

14. The filter module of claim 1, wherein: the flexible tube (4) has a second end (6) opposite the first end (5) of the flexible tube (4), the first and second ends (5, 6) of the flexible tube is spaced apart along a longitudinal direction of the flexible tube (4), the hollow fiber membranes (9) of the hollow fiber element (8) extend parallel to longitudinal direction of the flexible tube (4).

15. The filter module of claim 14, wherein the first end (16) of the hollow fiber element (8) is bonded adhesively to the intermediate piece (10) by the adhesive (15), and the adhesive (15) that adhesively bonds the first end (16) of the hollow fiber element (8) to the intermediate piece (10) has a uniform radial dimension at all positions along the hollow fiber element (8) that are contacted by the adhesive (15).

\* \* \* \* \*